Figure 1:
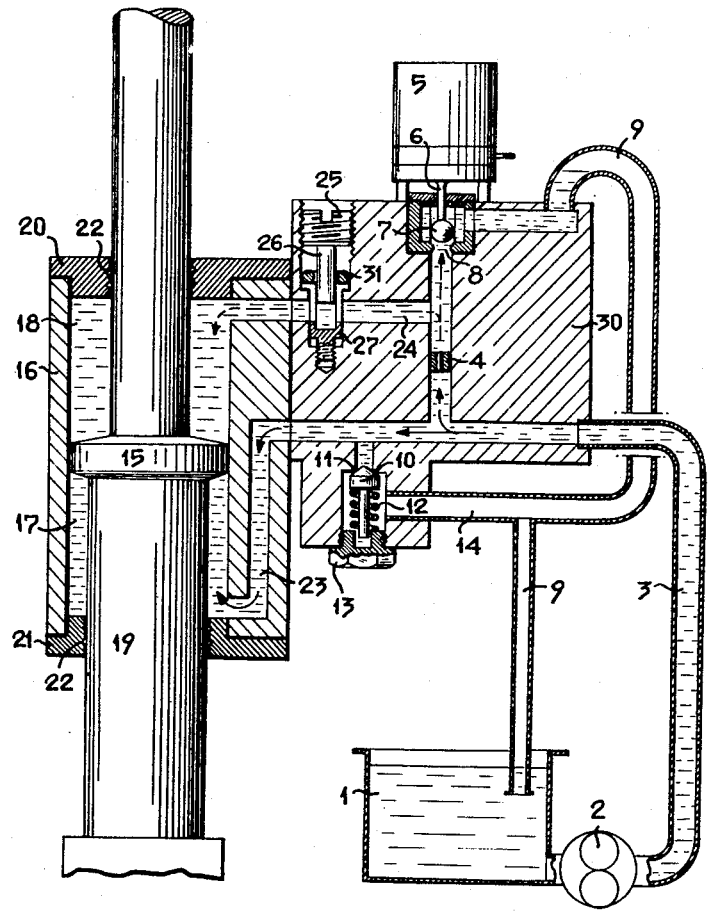

July 11, 1961

J. PFAU 2,991,758

HYDRAULIC SERVO-MECHANISM WITH ELECTRIC CONTROL

Filed Oct. 8, 1958

United States Patent Office 2,991,758
Patented July 11, 1961

2,991,758
HYDRAULIC SERVO-MECHANISM WITH ELECTRIC CONTROL
Jean Pfau, Geneva, Switzerland, assignor to Ateliers des Charmilles S.A., Geneva, Switzerland, a corporation of Switzerland
Filed Oct. 8, 1958, Ser. No. 766,099
Claims priority, application Switzerland Oct. 11, 1957
9 Claims. (Cl. 121—38)

Hydraulic servo-mechanisms with electric control are already known, which comprise a source of liquid under pressure supplying an hydraulic motor to which it is connected by a pipe having a derivation connecting to the exhaust of the liquid under pressure, the flow of liquid, which can escape through an orifice of said derivation, being adjusted by a control electromagnetic device applying an adjustable force on a closure member subjected to a return force. These servo-mechanisms are, for example, used in machines for machining by electro-erosion, in which the servo-mechanism should react immediately and control with great precision movements of very small values.

In fact, when effecting a finishing machining by electro-erosion, the distance between the part and the electrode, which should be maintained constant by the servo-mechanism, becomes very small and reaches values of the order of 5 to 20 microns. When a conducting impurity comes to lie between the electrode and the part to be machined, it immediately provokes a considerable reduction in the sparking distance and the servo-motor must effect a very rapid retraction of the electrode so as to avoid the formation of a short-circuit and the deteriorations of the machined surface which are generally the consequence thereof.

In known servo-mechanisms of this type, the aim has always been to modify the section of the escape orifice solely in proportion of the electric control signal and to eliminate as far as possible the reaction of the liquid under pressure on the closure member. The majority of devices of adjustable output are constituted by a cylindrical needle (or piston) moving axially in a bore, so as to more or less close an orifice provided in the wall of said bore, and are not very suitable in applications necessitating a high rapidity of reaction and a high precision, as in electro-erosion, as they are subjected to the well-known effect of adhesion which renders their response irregular and too slow.

For eliminating the effects of adhesion of the needle it is necessary to resort to an electro-mechanical control device of high power, but these have a too long reaction time. In order to obtain a sufficiently short time of response, it is necessary that the device transforming the electric control signals into mechanical action has a weak outlet power.

Servo-mechanisms are also known in which two passages supply fluid under pressure into two chambers for acting on two opposed faces of a piston, each of said passages having an escape orifice. The two orifices are located one opposite the other and a movable closure member is placed between them in such a manner as to uncover an orifice whilst it closes the other and reciprocally. The closure member is constituted by a hinged plate or pallet. This construction permits of eliminating the sticking effect of the needle or piston, but their adjustment is very delicate, as the median position of the pallet, which is determined by a spring of which the return force is large relatively to the reactions of the fluid under pressure on the plate, should be fixed with precision. Further, the servo-mechanisms of this type can only deliver a very low power.

The present invention has for its subject a servo-mechanism of the first type referred to, of which the construction is simple and which permits of remedying the inconveniences referred to, by reason of the fact that the closure member is disposed in such a manner that the return force is produced by the action of the liquid under pressure on the said closure member, the electro-magnetic device being actuated in such a manner that the force applied is practically independent of the position of the closure member, so that at each variation of the force applied by the electromagnetic device, the closure member moves over the distance necessary for provoking a corresponding variation of the pressure of liquid.

The accompanying drawing shows, diagrammatically and by way of example, a form of construction of the servo-mechanism according to the invention, adapted to control the machining electrode in an electro-erosion machine.

Figure 2:
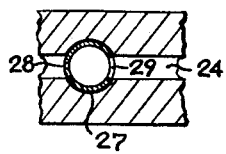
Figure 3:
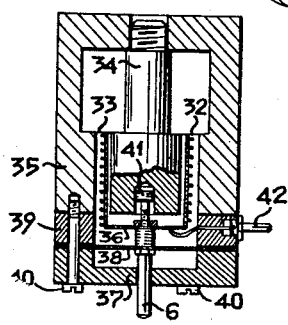

FIG. 1 is a view in section of said servo-mechanism.
FIG. 2 is a partial section to a larger scale.
FIG. 3 is a section of an electrodynamic control device.

The servo-mechanism shown in FIG. 1 comprises a source of liquid under pressure which is constituted by a reservoir 1 and a pump 2. The latter sends the liquid into a main conduit 3, which is provided with a constriction 4 of determined cross-section, then an adjustable supply device for connecting the liquid to exhaust. Said adjustable supply device has an electrodynamic control device 5, which has a finger 6, capable of applying a variable force on a floating closure member constituted by a ball 7. The force applied by the finger 6 tends to displace the ball 7 in the direction of an orifice 8 through which the liquid escapes under pressure. The liquid which has passed out through the orifice 8 returns to the reservoir 1 through a pipe 9. The pressure on the upflow of the constriction 4 is maintained constant by reason of a discharge valve constituted by a needle valve 10 which is applied against a seat 11 by a spring 12. Said spring bears, on the one hand, against the needle valve 10, and on the other hand against a plug 13 which permits of the mounting and the removal of the discharge valve. The liquid which has escaped through the discharge valve, by having displaced its needle 10 against the action of the spring 12, is returned to the reservoir 1 by a pipe 14 which leads into the pipe 9.

The servo-mechanism comprises a differential piston 15 sliding in a cylinder 16. The movements of said piston 15 provoke variations of unequal volume and of contrary direction in two chambers 17 and 18, each defined by the walls of the cylinder 16 and a face of the piston 15. The latter is constituted in one piece with a rod 19 which passes completely through the cylinder 16 and is adapted to be coupled to the element of which the hydraulic device is adapted to provoke the movement. Said rod 19 passes through two plugs 20 and 21 provided with fluidtight linings 22 and closing the two ends of the cylinder. An electrode-tool is secured by means not shown, to the lower end of the rod 19.

The chamber 17 is placed in communication with the main pipe 3 on the upflow side of the constriction 4 by a passage 23 and the chamber 18 is connected to the pipe 3 on the downflow side of the constriction 4 by a passage 24. The latter passage has a constriction of which the cross-section is adjustable by a screw 25. Said screw carries a cylindrical part 26 forming a piston, which is engaged in a sleeve 27 having two slits 28 and 29 of unequal width and which is shown in cross-section in FIG. 2. The sleeve 27 is provided at its lower end with a screw part permitting the securing of the said sleeve by screwing into a corresponding threaded bore provided in a block 30 which is secured to the cylinder 16 and in which are provided passages 23 and 24 and a part of the passage 3. Said block also carries the discharge valve and the device for adjustable delivery. The cylindrical part 26 of the screw 23 passes through a fluid tight joint 31 for preventing the liquid under pressure from leaking to the outside.

The electrodynamic control device 5 is shown in section in FIG. 3. It is formed by an electromechanical transformer having a movable winding 32 placed into a magnetic field. Said magnetic field is located in a gap 33 of cylindrical shape comprised between two parts 34 and 35 of which at least one constitutes a permanent magnet. The winding 32 is secured to a cylindrical portion of a part 36 in the form of a bell which is secured on the finger 6. The latter slides in a bore of a securing part 37 and is secured to a diaphragm 38 of which the periphery is clamped between the securing part 37 and an annular part 39 of insulating material, which is clamped by screws 40 between the parts 35 and 37. The diaphragm 38 is for the purpose of resiliently maintaining the finger 6 and thus the winding 32 in a well-determined position. The finger 6 is provided with a portion 41 sliding in a bore of the part 34. Two terminals 42, of which only one is visible in the drawing, are secured in the insulating part 39 and permit of insuring the electric connections between the winding 32 and its control circuit which is not shown in the drawing.

When the pump 2 is set in operation the pressure of liquid increases in the first portion of the passage 3 and in the chamber 17 until it reaches a value determined by the discharge valve. The liquid flows through the constriction 4 and, by reason of losses of pressure produced in said latter, the downflow pressure of said constriction is weaker than the upflow. The downflow pressure of the constriction 4, which is transmitted into the chamber 18, through the passage 24, depends on the supply of liquid through the constriction 4, this supply being adjusted by the pressure applied to the ball 7 by the electrodynamic device 5. When the ratio of the pressure in the chambers 17 and 18 is the inverse to that of the active surfaces of the differential piston, an equilibrium is produced and the piston does not move. When the pressure exerted by the finger 6 on the ball 7 is made to vary, this being effected by acting on the intensity of the current passed into the winding 32, the pressure of the downflow liquid in the constriction 4 is modified, which provokes a displacement of the differential piston.

The adjustable delivery device shown is very advantageous, as it does not necessitate precision in its mounting. In fact, the return force of the diaphragm 38 may be maintained very weak, so that the pressure applied by the finger 6 is practically determined solely by the intensity of the current passed into the winding 32. The force exerted by the finger 6 does not depend, or practically not, on the position of said finger. The ball 7 is thus subjected to two opposite forces of which one is due to the pressure of liquid which tends to withdraw it from the orifice 8 and the other is applied by the electrodynamic control device 5. There is thus obtained a direct relation of the downflow pressure of the constriction 4 in proportion to the control current of the electrodynamic device 5. The ball 7 automatically takes the necessary position, relatively to the orifice 8, so that the downflow pressure of the constriction 4 corresponds fully to that which is determined by the value of the control current. The device for adjustable delivery is, further, very advantageous by reason of the fact that the ball 7 is mounted floating, so that it is practically not subjected to any friction capable of acting on the sensitiveness of the assembly of the device.

The construction of adjustable cross-section, constituted by the screw 25 and the sleeve 27, permits of obtaining a constant speed of the piston 15 for a constant control current of the electrodynamic device 5. However, it is possible to omit this constriction and, in this case, a constant energizing current of the device 5 will determine a constant pressure in the chamber 18. As the pressure in the chamber 17 is also constant, the resultant force acting on the piston 15 will be constant and the movement of the latter will be uniformly accelerated, so that it is possible to neglect the losses of pressure in the passages.

By acting on the screw 25, it is possible to obtain the desired speed of the piston 15 for a given pressure in the chamber 18. Further, by reason of the viscosity of the liquid, a predetermined scope of adjustment for which the speed of the piston 15 is a linear function of the control current of the electrodynamic device 5, is obtained. This linearity is obtained in a simple manner and without necessitating delicate adjustment of the servo-mechanisms having two exhaust orifices disposed face to face, which have been referred to at the beginning of the present specification.

In addition to the advantages which result from the linear variation of the pressure in the passage 24 in proportion to the intensity of the control current, the electrodynamic device 5 is of great interest by reason of its very weak mechanical inertia and the low value of the self-induction of the winding 32. The time constant of said winding is very short, which permits of obtaining very rapid reactions of the servo-mechanism. Experiments have shown that it is possible to obtain time responses of the order of 4 milliseconds for the whole servo-mechanism, this time being calculated from the application of an electric signal at the electrodynamic control device, until the piston has reached 90% of its speed determined by the control current.

It is advantageous to be able to cause the speed of the piston 15 to be varied in proportion to the machining condition in electro-erosion machines for maintaining the same conditions of stability of the servo-mechanism in the different machining conditions, in spite of the fact that the electrode-part distance is larger for coarse or rough machining than that for fine machining. For fine machining it is of interest to limit the speed of movement of the piston 15, whilst maintaining a time of reaction as short as possible. This adjustment of the speed of the piston 15 is obtained very simply by acting on the screw 25 for adjusting the section of the constriction provided in the passage 24. This constriction produces an hydraulic braking comparable with that which is obtained in hydraulic shock-absorbers.

It is also to be observed that the movements of the ball 7 necessary for provoking relatively high variations of the downflow pressure of the constriction 4, are very small, for example of the order of $\frac{1}{10}$ mm.

It will be understood that numerous modifications may be applied to the device described and the ball 7 of the adjustable delivery device may be replaced by a needle secured to the end of the finger 6. Meanwhile, in this case, the precision of mounting the electrodynamic device relatively to the orifice 8 should be larger than in the case of the constriction described. The construction of the adjustable section may also be located in the passage 23 instead of in the passage 24. Meanwhile, as the delivery of liquid is smaller in the passage 23 than in the passage 24 for a given speed of the differential piston, the constriction of adjustable section should have relatively to the passage 24, a smaller section than in the passage 23 for having the same efficiency.

In the case of an electro-erosion machine of high power and capable of being equipped with one or more relatively heavy electrodes, it is necessary that the servo-mechanism should be capable of exerting a large force for provoking sufficiently rapid movements of the electrode or electrodes. When the pressure or delivery of the pump 2 is increased for increasing the force capable of being exerted by the differential piston, it is also necessary to increase the power of the electrodynamic control device 5. It is, however, not practicable from the constructive point of view, to exceed a predetermined power of the electrodynamic device, and it is more advantageous that the servo-mechanism comprises a hydraulic distributor controlled by the differential piston 15, said distributor controlling the functioning of an hydraulic motor of higher power than that of the differential piston. Said hydraulic motor is coupled to at least one electric tool for controlling its movements; when the movement of the differential piston 15 is braked strongly by an external action, this piston exerts a force which depends on that exerted on the ball 7, by the electrodynamic control device. It is therefore advantageous that the hydraulic distributor controlled by the differential piston 15 is constituted by an adjustable delivery device of the same type as that controlled by the electrodynamic device 5. The hydraulic motor is then constituted by a differential piston of larger dimensions than the piston 15.

I claim:
1. A hydraulic servo-mechanism with electric control comprising an hydraulic motor, a source of supply of liquid under pressure for said hydraulic motor, a pipe connecting said source of supply to said motor, an exhaust line, said pipe having a derivation connecting the same to said exhaust line, means for adjusting the flow of liquid which can escape through an orifice of said derivation, said means comprising a closure member for said orifice and a control electromagnetic device applying an adjustable force on said closure member subjected to a return force, said closure member being disposed in such a manner that a return force is produced thereon by the action of said liquid under pressure, said electromagnetic device being actuated in such a manner that the force applied is practically independent of the position of said closure member, so that, at each variation of said force applied by said electromagnetic device, said closure member moves over the distance necessary for provoking a corresponding variation of the pressure of liquid.

2. A servo mechanism according to claim 1, wherein said electromagnetic device is of the electrodynamic type and includes a finger located in the axis of flow from said exhaust orifice, said finger being in contact by its end against said closure member, said closure member being floating between said orifice and said finger and having a shape such that the forces exerted by said liquid maintain it bearing against said finger of said electrodynamic control device.

3. A servo-mechanism according to claim 2, wherein at least a portion of said passages, said electrodynamic control device and said constriction of adjustable cross-section are assembled in a single block, said block being secured to said cylinder in which said differential piston slides.

4. A servo-mechanism according to claim 6, wherein a discharge valve is adapted to maintain constant the pressure in said passage connecting said source of liquid under pressure and said working chamber, said discharge valve being mounted in a block secured to said cylinder.

5. A servo-mechanism according to claim 1, wherein said closure member is constituted by a ball.

6. A servo-mechanism according to claim 5, comprising a circuit actuated in such a manner as to cause an adjustable continuous current to pass into said electrodynamic control device.

7. A servo-mechanism according to claim 1, wherein said hydraulic motor is constituted by a differential piston sliding in a cylinder, whilst provoking unequal variations in volume and of contrary direction in two chambers, each of said chambers being defined by the walls of said cylinder and one face of said piston, one of said chambers being in communication with a source of liquid under constant pressure, the other of said chambers being in communication with said source through the medium of a passage having a constriction of constant cross-section and, on the downflow of said constriction, the said exhaust orifice being adjustable by said closure member, whilst a constriction of adjustable cross-section is provided in a passage connecting one of said chambers to the main passage.

8. A servo-mechanism according to claim 7, wherein said passage, having a constriction of adjustable cross-section, connects the chamber, in which the movement of the differential piston provokes the largest variations in volume, to said main passage on the downflow side of said constriction of determined section.

9. A hydraulic electrically controlled servo-mechanism comprising a hydraulic motor, said motor comprising a cylinder and a differential piston providing in said cylinder two chambers subject to oppositely directed unequal volume variations; a source of fluid pressure, a main supply line connecting said source with one of said chambers and supplying fluid under constant pressure, a second line connecting said main supply line with the other of said chambers, a constriction of constant cross section and another constriction of adjustable cross section in said second line, a return line for the fluid to said source, a conduit branching from said second line between said two constrictions and opening into said return line, a floating ball valve in said opening, a movable finger located in the axis of the direction of flow of the fluid leaving said conduit and contacting said ball opposite the surface impinged by the fluid, a diaphragm movably and resiliently supporting said finger, and electromagnetic means controlling the position of said finger, said finger position controlling the position of the valve ball and thereby the pressure in said second line.

References Cited in the file of this patent
UNITED STATES PATENTS

| | | |
|---|---|---|
| 2,636,581 | Bitler | Apr. 28, 1953 |
| 2,777,425 | Adams | Jan. 15, 1957 |
| 2,789,541 | Gaspar | Apr. 23, 1957 |